United States Patent [19]
Narita et al.

[11] Patent Number: 5,887,991
[45] Date of Patent: Mar. 30, 1999

[54] PRINTER BUFFER UNIT DETECTING PHASE OF TRANSITION SIGNAL TO INITIATE JOB OFFSET COMMAND

[75] Inventors: Izumi Narita, Koganei; Akihisa Kusano; Yuzo Seino, both of Kawasaki; Kaoru Sato; Tatsuto Tachibana, both of Yokohama; Tomohiro Nakamori, Machida, all of Japan

[73] Assignee: Canon Kabushiki Kaisha, Tokyo, Japan

[21] Appl. No.: 281,666

[22] Filed: Jul. 28, 1994

Related U.S. Application Data

[63] Continuation of Ser. No. 111,585, Aug. 25, 1993, abandoned, which is a continuation of Ser. No. 797,195, Nov. 25, 1991, abandoned.

[30] Foreign Application Priority Data

Nov. 27, 1990 [JP] Japan ................................. 2-324053

[51] Int. Cl.⁶ ..................................................... B41J 3/42
[52] U.S. Cl. ............................................. 400/70; 385/114
[58] Field of Search ................................... 395/111, 112, 395/114, 113; 400/54, 74

[56] References Cited

U.S. PATENT DOCUMENTS

| | | | |
|---|---|---|---|
| 4,630,198 | 12/1986 | Yuan | 400/61 |
| 5,014,221 | 5/1991 | Mogul | 395/113 |
| 5,293,466 | 3/1994 | Bringmann | 390/112 |
| 5,299,296 | 3/1994 | Padalino | 395/114 |
| 5,327,526 | 7/1994 | Nomura | 395/114 |

FOREIGN PATENT DOCUMENTS

| | | | |
|---|---|---|---|
| 0123806 | 11/1984 | European Pat. Off. | 400/61 |
| 126432 | 6/1987 | Japan | 400/624 |
| 60870 | 3/1988 | Japan | 400/71 |
| 48363 | 2/1990 | Japan | 400/578 |
| 99377 | 4/1990 | Japan | 400/71 |

OTHER PUBLICATIONS

Bostwick, "Software Drivers Control Printers", *Mini–Micro Systems*, vol. 19, No. 3, pp. 11–18, Feb. 1986.

IBM Technical Disclosure Bulletin, "Printer Data Stream Method to Allow Dynamic Stream Switching", vol. 33, No. 1B, Jun. 1990.

IBM Technical Disclosure Bulletin, "Checkpointing for Printer Restart", Maholick et al., vol. 24, No. 3, Aug. 1981.

SCSI Manual Aug. 22, 1989, Working Draf Proposal 0–2, Revision 106, American National Standard for Information Systems. "Small Computer System Interface 2"Note: Copies May be Purchased from: Global Engineering Documents, 2805 McGraw, Irvine, CA. 92714 (800) 854–7179 or (714) 261–1455, Refer to Document x3.131–198x.

*Primary Examiner*—Eugene Eickholt
*Attorney, Agent, or Firm*—Fitzpatrick, Cella, Harper & Scinto

[57] ABSTRACT

A printer buffer unit is connectable to one or a plurality of host computers and one or a plurality of printers. The printer buffer unit has a unit for detecting a break of print job data sent from a host computer, and a unit for adding a job offset command at the time of the break in sending the print job data to a printer.

9 Claims, 6 Drawing Sheets

PRINTER BUFFER UNIT DETECTING PHASE OF TRANSITION SIGNAL TO INITIATE JOB OFFSET COMMAND

This application is a continuation of application Ser. No. 08/111,585 filed Aug. 25, 1993, now abandoned, which is a continuation of application Ser. No. 07/797,195 filed Nov. 25, 1991 now abandoned.

BACKGROUND OF THE INVENTION

1. Field of the Invention

The present invention relates to a printer buffer unit used in a system having one or a plurality of host computers which share one or a plurality of printers.

2. Related Background Art

Conventionally, in sharing one or a plurality of printers by one or a plurality of host computers, a printer buffer unit operates simply to send data from a host computer to a printer to sequentially print the data.

If a print job of a host computer has been completed and the next print job occurs, documents for the next print jobs are ejected onto the documents for the present print job. Therefore, there arises a problem that it takes time to discriminate between documents of different jobs.

Furthermore, documents for different print jobs outputted from a plurality of host computers are ejected as to be superposed one upon another on the eject tray of the same printer. Therefore, it arises a problem that it takes time to discriminate between documents of different print jobs from different host computers.

Still further, if an error such as no printing sheet, jamming, or the like occurs at a printer under operation and it becomes impossible to continue the print-out operation, there arises a problem that the print job cannot be terminated unless such an error is informed to the host computer and a printer error recovery operation is carried out manually by the operator.

Furthermore, if a plurality of printers are connected to a printer buffer unit and the sizes of printing sheets or the like for the printers are different, a host computer is required to check the printers connected to the printer buffer unit and select a suitable one.

SUMMARY OF THE INVENTION

It is an object of the invention to provide a printer buffer unit capable of allowing easy discrimination between ejected documents of different print jobs.

According to a printer buffer unit of the present invention, different print jobs for each host computer or computers are discriminated, and a job offset command is issued to the printer at the break of each print job. Accordingly, without increasing a burden on a host computer, printing sheets for each print job or host computer can be ejected out to different position, allowing easy discrimination between different documents.

It is another object of the present invention to provide a printer buffer unit excellent in operation and capable of performing a mode selection or the like for proper printing without complicated manipulations.

According to a printer buffer unit of the present invention, if an error occurs at a particular printer among a plurality of printers, another printer is automatically selected and used.

According to a printer buffer unit of the present invention, the type of printers is automatically checked to select a suitable printer for a particular printer job of a host computer.

Since the printer buffer unit can monitor the status of a plurality of printers, when an error occurs at a printer, it is possible to automatically change to another printer and not to interrupt the print job, without increasing a burden on a host computer. Still further, it is possible to print out print data by automatically selecting a printer suitable for the conditions requested by the host computer.

The other objects, advantages, and effects of the present invention will become more apparent from the following detailed description and appended claims when read in conjunction with the accompanying drawings.

DETAILED DESCRIPTION OF THE PREFERRED EMBODIMENTS

Preferred embodiments of the present invention will be described with reference to the accompanying drawings.

Figure 1:
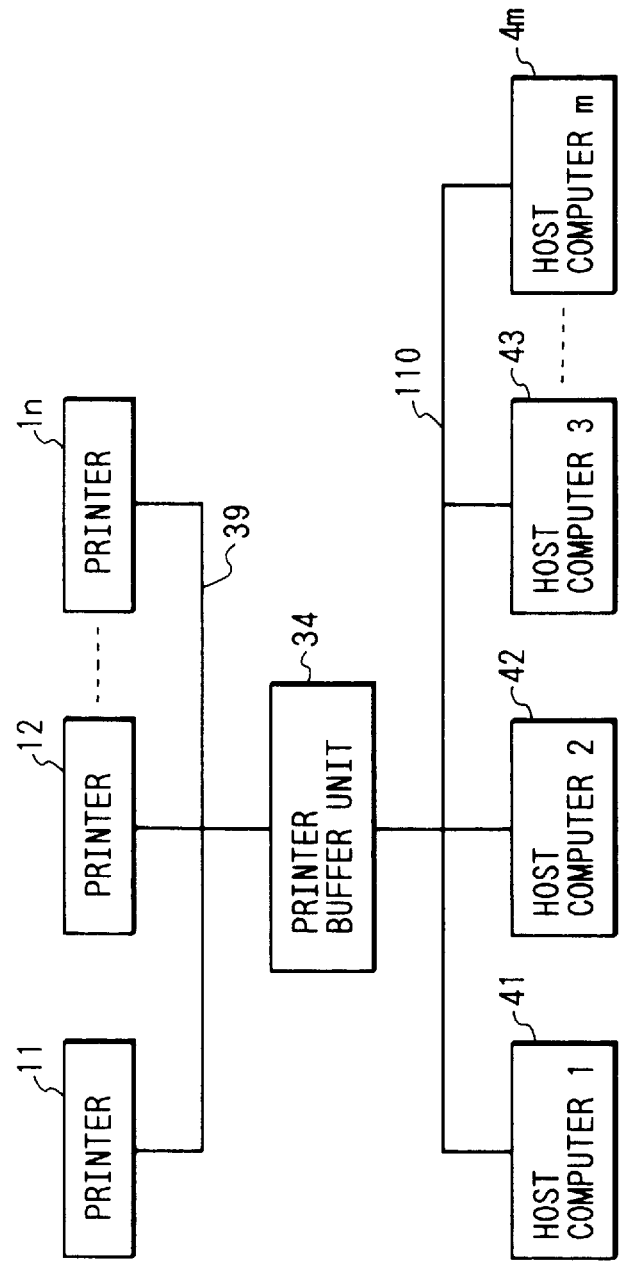
FIG. 1 is a block diagram showing the system arrangement of a printer buffer unit according to an embodiment of the present invention.

FIG. 1 is a block diagram showing the system arrangement of a printer buffer unit according to an embodiment of the present invention.

The printer buffer unit 34 of this embodiment is connected via a printer interface line 39 to n printers 11 to 1n, and via a host interface line 110 to m host computers 41 to 4m.

Figure 2:
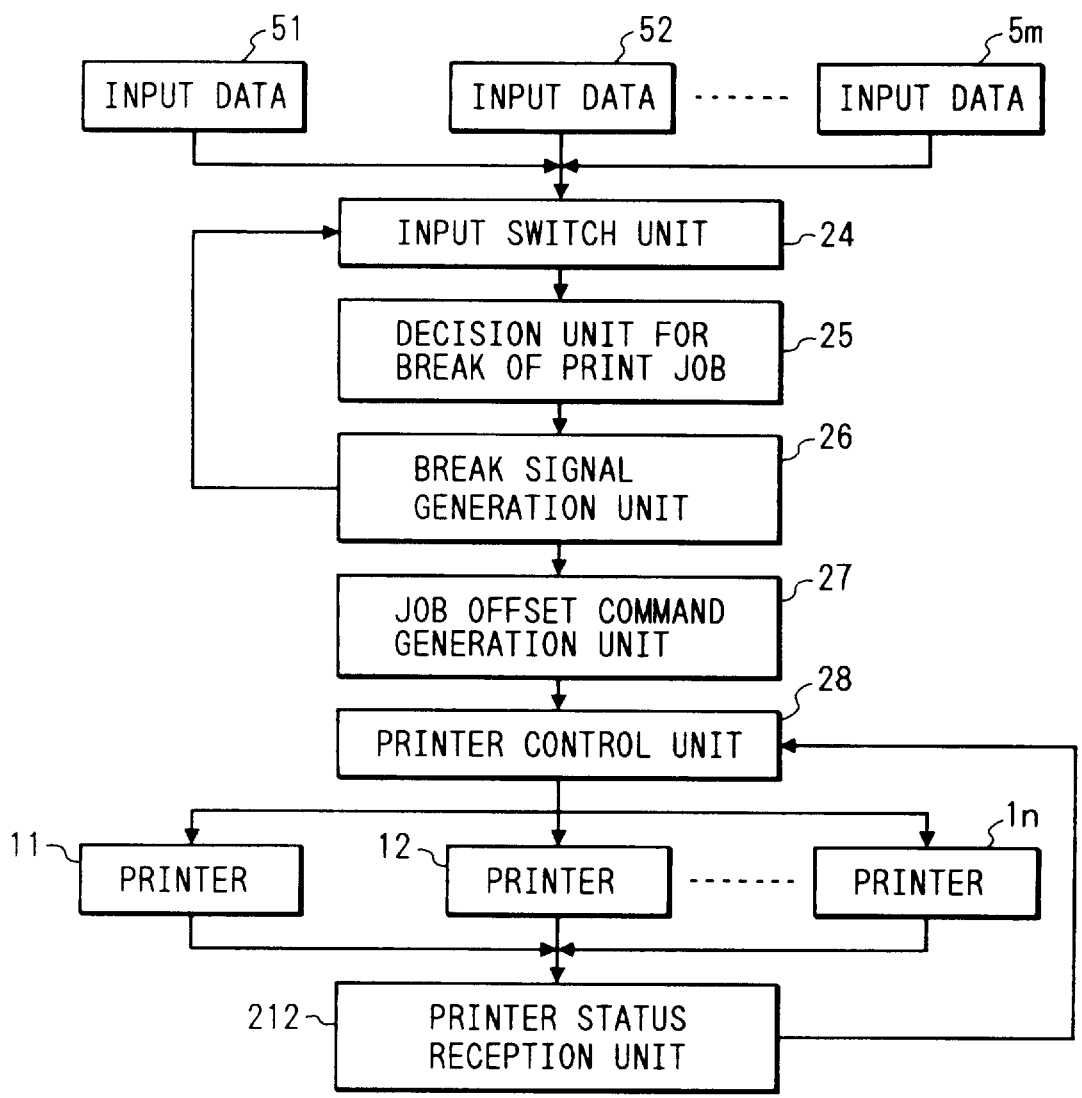
FIG. 2 is a block diagram illustrating the outline of the procedure to be executed by the printer buffer unit of the embodiment.

FIG. 2 is a block diagram of a detailed system arrangement illustrating the outline of the procedure to be executed by the printer buffer unit 34.

Input data 51 to 5m is supplied from the corresponding host computers 41 to 4m.

As data processing units, there are provided an input switch unit 24 for selecting one of the input data 51 to 5m from the host computers 41 to 4m, a decision unit 25 for deciding a break of print job, a break signal generation unit 26 for generating a print job break signal, a command generation unit 27 for generating a job offset command a, printer control unit 28 for controlling the printers 11 to 1n, and a printer status reception unit 212 for receiving status information such as printer error from the printers 11 to 1n.

In the printer buffer unit constructed as above, one of the input data 51 to 5m is selected by the input switch unit 24.

The decision unit 25 monitors a break of print job of the selected printer. Until the break signal generation unit 26 generates a break signal and instructs the input switch unit 24 in response to the decision result of the decision unit 25, the input switch unit 24 will not accept another input data.

A job offset command is issued by the command generation unit 27 to the selected printer.

The status of the selected printer is monitored by the status reception unit 212. If a print error or the like occurs, its status is notified to the printer control unit 28.

Figure 3:
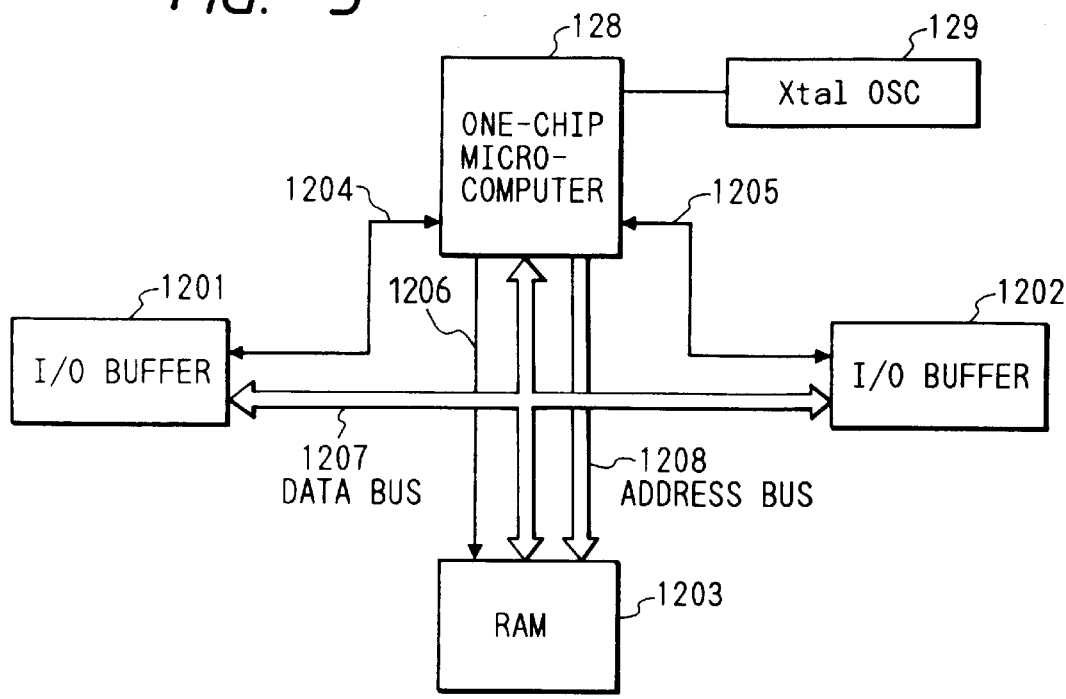
FIG. 3 is a circuit diagram showing an example of the hardware arrangement of the printer buffer unit of the embodiment.

FIG. 3 is a circuit diagram showing an example of the hardware arrangement of the printer buffer unit 34.

The printer buffer unit 34 has a one-chip microcomputer 128 for controlling the whole system of the printer buffer unit 34, a crystal oscillator 129 for supplying clock pulses to the one-chip microcomputer 128, an I/O buffer 1201 for interface with the host computers, another I/O buffer 1202 for interface with the printers, a RAM 1203 for temporarily storing print data, a data bus 1207, and an address bus 1208.

The one-chip microcomputer 128 outputs a host interface control signal 1204, a printer interface control signal 1205, a RAM control signal 1206, and so on.

In the printer buffer unit 34 having the above-described structure, print data inputted from an interface of a host computer in the buffer 1201 is stored in RAM 1203 in response to the control signal 1204 from the one-chip microcomputer 128.

At the same time, a job offset command is issued from the one-chip microcomputer 128 to a printer via the buffer 1202. Then, the data in RAM 1203 is sent via the buffer 1202 to the printer in response to the control signal 1206.

An example of a control operation program of the one-chip microcomputer 128 will be described.

Figure 4:
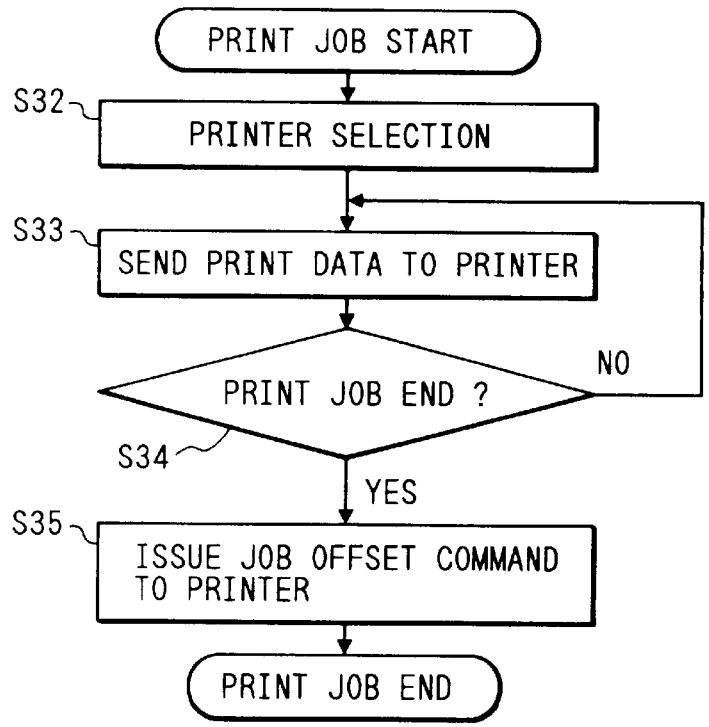
FIG. 4 is a flow chart showing a first example of the control operation of the embodiment.

FIG. 4 is a flow chart showing a first example of the control operation wherein a job offset command is issued to a printer each time a print job is changed so that printing sheets for each print job are ejected to a different position.

First, when print data is sent from a host computer to the print buffer unit, a print job starts.

One of the printers connected to the printer buffer unit is selected (step S32) to start sending print data to the selected printer (step S33).

It is checked if the print job has been completed (step S34). Assuming that interface between the host computer and the printer buffer unit is performed using SCSI, the end of a print job is detected while monitoring the phase transition of SCSI. Specifically, the printer buffer unit determines as an end of a print job when a data-out phase during which print data is sent from the host computer transits to another phase such as a message phase.

If print data continues to be sent from the host computer, the print data is maintained to be sent. If the print job end is detected, a job offset command is issued to the printer (step S35) which in turn performs an offset operation. With the above procedure, the print sheet eject position of the next print job can be made different from that of the present print job.

Figure 5:
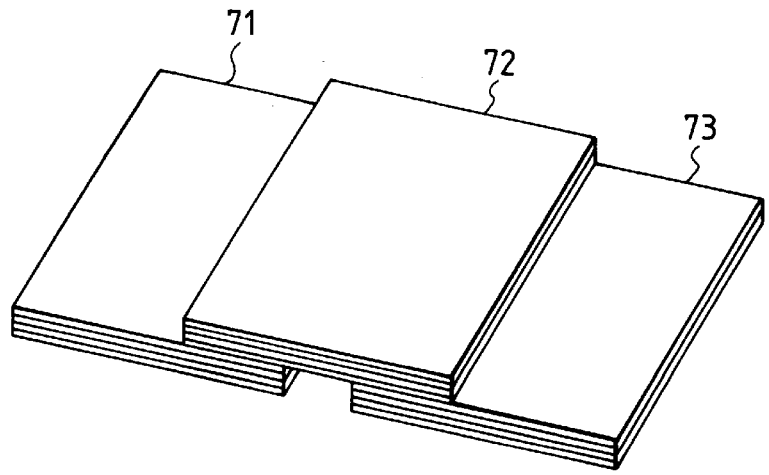
FIG. 5 is a schematic diagram showing the printing sheet eject state when an offset command is executed in the first control operation.

FIG. 5 is a schematic diagram showing an example of the state of printing sheet eject when such an offset command is executed. As shown in FIG. 5, three documents 71 to 73 for three print jobs are ejected to three different positions, enabling to readily discriminate between three documents of respective print jobs.

Figure 6:
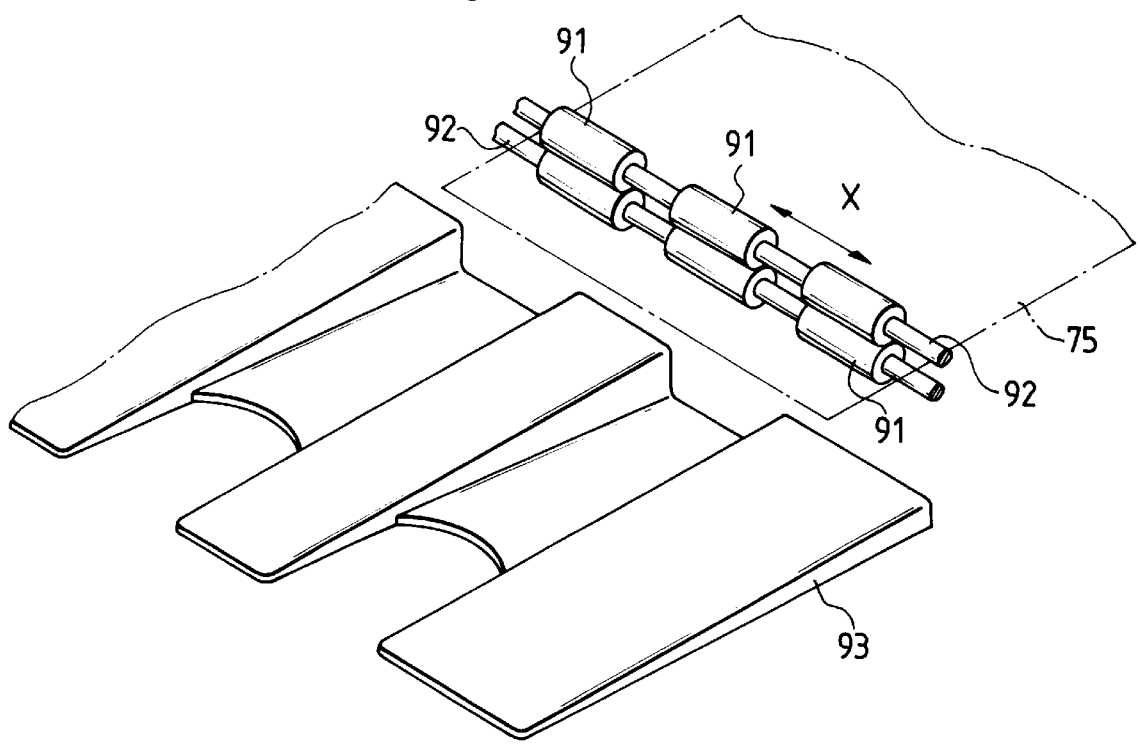
FIG. 6 is a perspective view showing the outline of an eject unit with a function to offset a printing sheet eject position in the first control operation.

FIG. 6 is a perspective view showing the outline of an eject unit having a function to offset the position of a printing sheet.

In this embodiment, in order to offset the position of a printing sheet 75, eject rollers 91 are moved in the axial direction (in X direction indicated by an arrow) while squeezing the sheet 75 after it reaches the rollers 91.

In the above manner, the eject position of the printing sheet 75 is changed, and the offset eject state such as shown in FIG. 5 can be obtained.

The eject rollers 91 and their drive shafts 92 may be moved by using a shift mechanism (not shown) driven by a motor or the like. The steps of shift amount may be set to multi-levels so that multi-level offset eject positions can be obtained.

An eject tray 93 is made wide so as to match the offset eject of a printing sheet.

Figure 7:
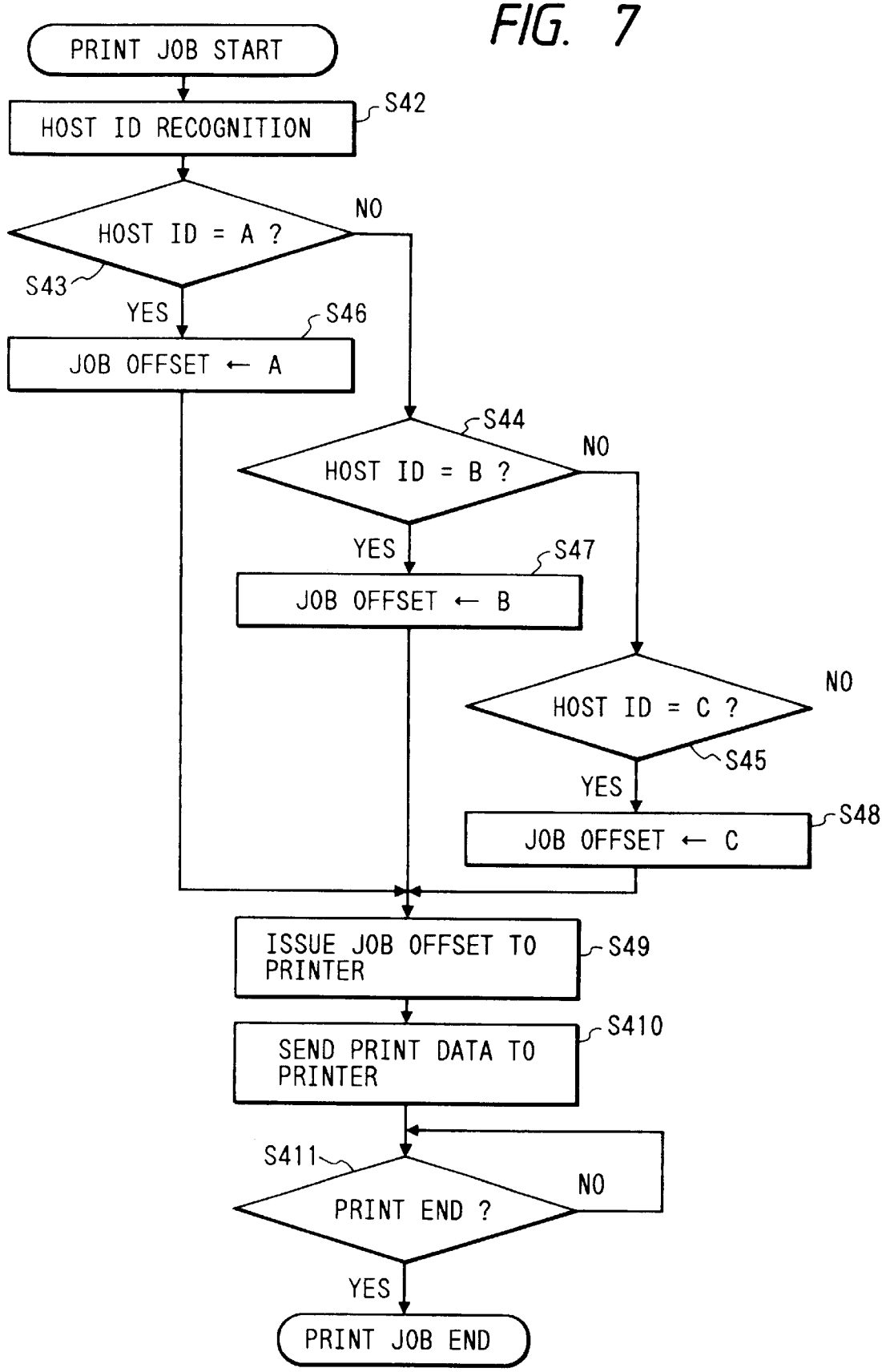
FIG. 7 is a flow chart showing a second example of the control operation of the embodiment.

FIG. 7 is a flow chart showing a second example of the control operation wherein an offset operation is performed by a printer each time a host computer is changed to another so that printing sheets for each host computer can be ejected to a different position.

First, when print data is sent from a host computer to the print buffer unit, a print job starts.

A host ID of the host computer is checked (step S42). In accordance with the checked host IDs (step S43 to step S45), different job offset commands are set (step S46 to S48).

The job offset commands set in the above manner are issued to the printers (step S49), so that the printing sheet eject position for each host computer becomes different. An example of such different eject positions is like that shown in FIG. 5.

Next, print data is sent to a printer (step S410) until the end of the print job. At the end of a series of print jobs (step S411), the procedure is terminated.

Figure 8:
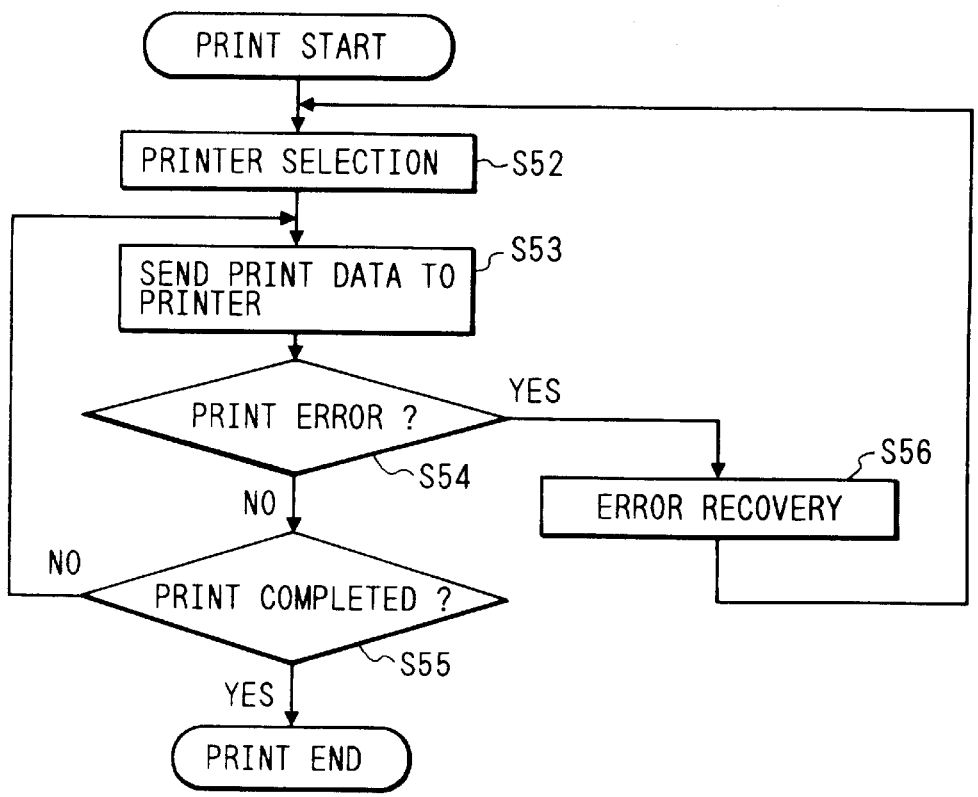
FIG. 8 is a flow chart showing a third example of the control operation of the embodiment.

FIG. 8 is a flow chart showing a third example of the control operation including an error recovery operation wherein when an error occurs at one printer during performing a print job, the printer buffer unit automatically selects another printer.

First, when print data is sent from a host computer to the print buffer unit, a print job starts.

A printer is selected to which the print data is sent from the printer buffer unit (step S52).

The print data is sent to the selected printer (step S53), and the printer is monitored if it performs a normal operation (step S54). If there is no printer error, the above steps are repeated until the print job has been completed (step S55). If an error occurs during the printing operation, an error recovery operation is performed (step S56). Namely, the control returns to step S52 to select another printer. If this selected printer can be used, the print job continues by using this printer without intercepting the printing operation, and the printing operation is terminated after the print job has been completed (step S55). In this case, documents for one print job are ejected out by two printers. Such effect may be informed to the host computers for the two printers.

Figure 9:
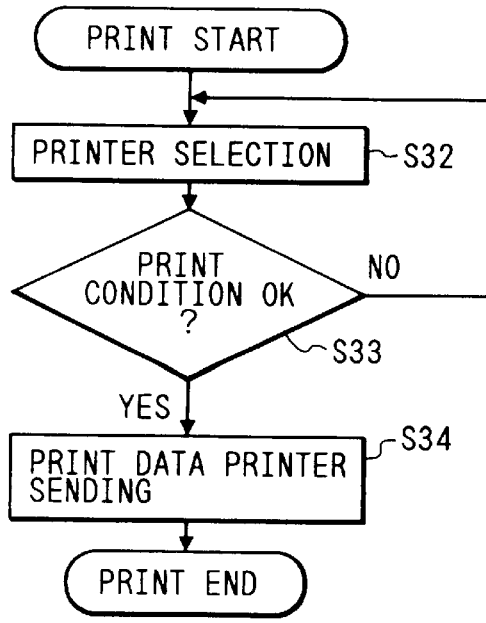
FIG. 9 is a flow chart showing a fourth example of the control operation of the embodiment.

FIG. 9 is a flow chart showing a fourth example of the control operation wherein a printer suitable for a particular print job is automatically selected and print data is printed out by the selected printer.

The type of a printer to be selected depends on the size of a printing sheet, on whether it can print on both sides of a printing sheet, and on other conditions.

First, when print data is sent from a host computer to the print buffer unit, a print job starts.

A printer connected to the printer buffer unit is checked at step S62. At step S63 it is checked whether the type of the connected printer matches the conditions requested by the host computer. If affirmative, the print data is sent to the printer at step S64 and printed out until the print job has been completed.

In the above embodiments, printing sheets are ejected out to the same eject tray at different positions. If one printer has a plurality of eject trays, printing sheets may be selectively ejected out to different eject trays.

Furthermore, for realizing the function of the printer buffer unit, this function may be built in each printer without using the discrete printer buffer unit.

Still further, the above-described examples of the control operation may be used as a combination thereof, or selectively used upon designating each mode.

An external storage device such as a hard disk may be provided for the printer buffer unit. In this case, a number of print jobs greater than those used with only the internal buffer memory can be processed, and a burden on a host computer can be reduced and another print job can be processed at an earlier time.

As described above, according to the present invention, a function is provided to the printer buffer unit to issue a job offset command. Therefore, without increasing a burden on a host computer, printing sheets for each print job or host computer can be ejected out to a different position, allowing easy discrimination between different documents.

Furthermore, a function is provided to the printer buffer unit to monitor the status of a plurality of printers. Therefore, without increasing a burden on a host computer, when an error occurs at a printer, it is possible to automatically change to another printer and not to intercept the print job. Still further, it is possible to print out print data by automatically selecting a printer suitable for the conditions requested by the host computer.

What is claimed is:

1. A printer buffer apparatus connected between a host computer and a printer, said printer buffer apparatus comprising:

means for receiving print job data transmitted from the host computer according to a predetermined protocol, wherein a plurality of series of print job data, which are not delimited by a job offset command, are receivable by said receiving means;

means for detecting a transition of phase of communication with the host computer;

means for generating a job offset command on the basis of the detected transition of the phase of the communication; and means for outputting the received print job data, said outputting means outputting the plurality of series of print job data, which are delimited by the job offset command generated by said generating means.

2. A printer buffer apparatus according to claim 1, wherein said apparatus is connectable with a plurality of host computers through a common line.

3. A printer buffer apparatus according to claim 1, wherein said receiving means receives the print job data sent from the host computer according to SCSI protocol, and said generating means generates a job offset command in response to a transition between a data-out phase and another phase.

4. A system comprising a printer buffer apparatus, a host computer, and a printer, said printer buffer apparatus comprising:

means for receiving print job data transmitted from said host computer according to a predetermined protocol, wherein a plurality of series of print job data, which are not delimited by a job offset command, are receivable by said receiving means;

means for detecting a transition of phase of communication with said host computer;

means for generating a job offset command on the basis of the detected transition of the phase of the communication; and means for outputting the received print job data, said outputting means outputting the plurality of series of print job data, which are delimited by the job offset command generated by said generating means.

5. A system according to claim 4, wherein said system comprises a plurality of host computers connected with said printer buffer apparatus through a common line.

6. A system according to claim 4, wherein said receiving means receives the print job data sent from said host computer according to SCSI protocol, and said generating means generates a job offset command in response to a transition between a data-out phase and another phase.

7. A method of operating a buffer apparatus connected between a host computer and a printer, said method comprising:

receiving print job data transmitted from the host computer according to a predetermined protocol, wherein a plurality of series of print job data, which are not delimited by a job offset command, are receivable in said receiving step;

detecting a transition of phase of communication with the host computer;

generating a job offset command on the basis of the detected transition of the phase of the communication; and outputting the received print job data, wherein the plurality of series of print job data, which are delimited by the job offset command generated in said generating step are outputtable in said outputting step.

8. A method according to claim 7, wherein the printer buffer apparatus is connectable with a plurality of host computers through a common line.

9. A method according to claim 7, wherein the print job data, which is sent from the host computer according to SCSI protocol, is received in said receiving step, and a job offset command is generated in said generating step in response to a transition between a data-out phase and another phase.

* * * * *